US009952378B2

(12) United States Patent
Lautenschläger et al.

(10) Patent No.: US 9,952,378 B2
(45) Date of Patent: Apr. 24, 2018

(54) LIGHT GUIDE PLATE AND OPTICAL DISPLAY WITH BACKLIGHTING

(71) Applicant: SCHOTT AG, Mainz (DE)

(72) Inventors: Gerhard Lautenschläger, Jena (DE); Thomas Kloss, Jena/Cospeda (DE); Jochen Alkemper, Klein-Winternheim (DE); Matthias Schmidt, Jena (DE); Andreas Voitsch, Jena (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/239,191

(22) Filed: Aug. 17, 2016

(65) Prior Publication Data
US 2017/0052311 A1 Feb. 23, 2017

(30) Foreign Application Priority Data

Aug. 17, 2015 (DE) ........................ 10 2015 113 558

(51) Int. Cl.
*F21V 7/04* (2006.01)
*F21V 8/00* (2006.01)
*C03C 3/091* (2006.01)
*C03C 4/00* (2006.01)

(52) U.S. Cl.
CPC ............ *G02B 6/0065* (2013.01); *C03C 3/091* (2013.01); *C03C 4/0092* (2013.01); *G02B 6/0043* (2013.01)

(58) Field of Classification Search
CPC .. G02B 6/0065; G02B 6/0043; C03C 4/0092; C03C 3/091
See application file for complete search history.

(56) References Cited

U.S. PATENT DOCUMENTS

| 5,747,399 A | 5/1998 | Kosokabe et al. | |
| 2002/0081246 A1* | 6/2002 | Tsukada | B01D 39/06 422/186.3 |
| 2005/0037911 A1 | 2/2005 | Fechner et al. | |
| 2005/0096209 A1* | 5/2005 | Kase | C03C 1/00 501/56 |
| 2009/0109373 A1* | 4/2009 | Taniguchi | G02B 6/0043 349/65 |
| 2009/0280277 A1* | 11/2009 | Shiratori | C03C 3/095 428/34.4 |
| 2010/0110728 A1* | 5/2010 | Dubrow | C09K 11/025 362/615 |
| 2014/0043852 A1 | 2/2014 | Zeng | |
| 2014/0146267 A1 | 5/2014 | Huang | |
| 2014/0152914 A1 | 6/2014 | King | |
| 2014/0309099 A1* | 10/2014 | Naylor | C03C 3/087 501/71 |
| 2015/0166401 A1* | 6/2015 | Yamamoto | C03C 3/085 428/410 |
| 2016/0137546 A1 | 5/2016 | Lambricht et al. | |
| 2016/0152511 A1 | 6/2016 | Lambricht et al. | |
| 2016/0159681 A1 | 6/2016 | Lambricht et al. | |
| 2016/0168012 A1 | 6/2016 | Lambricht et al. | |
| 2016/0194241 A1 | 7/2016 | Lambricht et al. | |
| 2016/0313494 A1* | 10/2016 | Hamilton | G02B 6/0068 |

FOREIGN PATENT DOCUMENTS

| DE | 102004027119 | 12/2004 |
| JP | 2002293571 | 10/2002 |
| WO | 2015011040 | 1/2015 |
| WO | 2015011041 | 1/2015 |
| WO | 2015011042 | 1/2015 |
| WO | 2015011043 | 1/2015 |
| WO | 2015011044 | 1/2015 |
| WO | 2015033866 | 3/2015 |
| WO | 2015071456 | 5/2015 |

* cited by examiner

*Primary Examiner* — Donald Raleigh
(74) *Attorney, Agent, or Firm* — Ohlandt, Greeley, Ruggiero & Perle, L.L.P.

(57) ABSTRACT

A light guide plate for guiding of visible light for the backlighting of a liquid crystal display is provided. The light guide plate has two parallel lateral faces and at least one edge face, which serves preferably as a light input face. The light guide plate is a glass that contains $B_2O_3$ and $SiO_2$ as components, wherein the total content of $B_2O_3$ and $SiO_2$ is at least 70 weight percent and the $B_2O_3$ content is greater than 10%. The total content of metal oxide of divalent metals in the composition of the glass is less than 3 weight percent. $Al_2O_3$ is contained between 1 weight percent and 5 weight percent in the composition.

19 Claims, 6 Drawing Sheets

LIGHT GUIDE PLATE AND OPTICAL DISPLAY WITH BACKLIGHTING

CROSS REFERENCE TO RELATED APPLICATIONS

This application claims benefit under benefit under 35 U.S.C. § 119(a) of German Patent Application DE 10 2015 113 558.2 filed Aug. 17, 2015, the entire contents of which are incorporated herein by reference.

BACKGROUND

1. Field of the Invention

The invention in general relates to optical components for display screens, in particular for liquid crystal monitors. In particular, the invention relates to optical components for displays with backlighting.

2. Description of Related Art

Liquid crystal displays are not self-illuminating and have to be illuminated from the back in order to obtain an illuminated image corresponding to other types of displays, such as cathode ray tubes, plasma display screens, or OLED displays. Displays, in particular those of high-resolution LCD television sets with high image quality, therefore require a so-called backlight system, in which, typically, light of white LEDs is in-coupled laterally at one or more edges indirectly or, from the back, directly into a light guide plate or diffuser plate. Such a system is referred to as edge lighting (edgelit backlight unit) or as backlighting (direct backlight unit). Traditionally, in this case, a plastic plate is used, for example one made of especially translucent PMMA (polymethyl methacrylate) or made of other transparent polymers that can be fabricated especially inexpensively and in high purity without selective absorption in the visible wavelength region. However, these materials often exhibit degradation phenomena due to undesired moisture uptake (incorporation of water molecules from the ambient humidity) and, when subjected to permanent light irradiation, can become brittle. This, in turn, is detrimental to the image quality and service life.

With increasing display screen diagonal dimensions—which tend to be greater than 55 inches up to, at present, generally at most 70-inch format—or else when individual displays are combined to form very large video walls, this material has a drawback, because it exhibits a very high thermal expansion coefficient, which is a multiple (>15 times greater) than that of the display glass, and is also especially susceptible to high local thermal load due to the heat input of the many light-emitting diodes (e.g., up to approximately 1500 LEDs in the case of direct in-coupling).

On account of the high thermal expansion coefficient as well as moisture-dependent expansion of the light guide plates made of plastic, compensatory spaces, in particular so-called spacer gaps, must be provided in liquid crystal monitors. This leads, on the one hand, to relatively wide frames of devices, but also to augmented depth (thickness) of devices, because flat components having different thermal expansion coefficients must be installed next to one another with sufficient spacing. In addition, plastic exhibits a low stability, so that, typically, additional structural components are required. Liquid crystal display screens therefore have a minimum thickness of about 30 millimeters with current technology.

For the production of liquid crystal TV sets that are as thin as possible and as light as possible, therefore, the hitherto conventional use of light guide plates made of plastic is a disadvantage.

US 2014/0043852 A1 and US 2014/0146267 A1 describe design solutions that are intended to overcome these disadvantages. The solutions shown therein are elaborate, however, and are only partially successful and, above all, they do not overcome the drawback in principle of PMMA light guides, namely, the necessary thickness thereof.

End consumers meanwhile desire television screens with a depth (thickness) of only a few millimeters. However, this is not technically possible if the PMMA light guide plate itself already exhibits a thickness of at least 3.5 mm in practice and additionally requires spacer gaps.

Although televisions or displays that operate by means of OLED technology attain very small thicknesses, they have the drawback within the production process that pixel flaws reduce the performance and that, particularly in the case of very large display screen diagonals of greater than 55 inches, these devices are very expensive. Beyond this, they need, in addition, a reinforcement element in order to ensure the requisite rigidity in day-to-day use.

Therefore, it would be advantageous to employ a glass as material for the light guide instead of the generally used PMMA plastic.

Described in WO 2015/033866 is an apparatus with an edgelit backlight unit and a light-emitting surface, said apparatus comprising a glass plate. However, the described features are not adequate to achieve a good transmission equivalent to that of PMMA. The best values described are just 83% or greater for a light-path length of only 100 mm.

US 2014/0152914 A1 describes a glass with high transparency for a touch display screen, which detects the finger position by means of frustrated total reflection. To this end, light in the wavelength range of 750-2500 nm, that is, in the infrared spectral region, is used. However, the samples show strong fluctuations of the absorption coefficient, in particular in the visible wavelength range of 400-800 nm. In this wavelength range, the maximum absorption coefficient is at least twice the minimum absorption coefficient. In the exemplary embodiment illustrated in FIG. 9, the absorption coefficient is even 0.00021 $mm^{-1}$ at approximately 470 nm and 0.00089 $mm^{-1}$ at approximately 430 nm. However, strong fluctuations in the absorption coefficient are not suitable for light guide plates. Desired instead are low, uniformly running absorption coefficients that result in a uniform transmission curve in the visible wavelength region.

WO 2015/011040 A1, WO 2015/011041 A1, WO 2015/011042 A1, WO 2015/011043 A1, WO 2015/011044 A1, and WO 2015/071456 A1 also relate to glass plates with high transmission in the infrared region, which can be employed in touch display screens, wherein, by means of the technology of so-called planar scatter detection (PSD) or by means of the frustrated total reflection, the position of objects on the surface is determined. It is known that $Fe^{2+}$ and $Fe^{3+}$ give rise to absorption bands with band maxima at 380 nm (relatively low absorption) and 1050 nm (relatively strong absorption), which can be influenced by oxidizing substances. The mentioned applications describe how, in the case of a tolerated, relatively high iron content ($Fe_2O_3$), it is possible to achieve a high transmission in the infrared region by targeted addition of chromium (Cr). However, these teachings cannot contribute to the optimization of light guide plates for the visible wavelength region.

SUMMARY

Accordingly, the object of the invention is to find a glass composition that is suitable for light guide plates for guiding visible light, in particular for use in liquid crystal displays and liquid crystal display screens.

One aspect of the object is to choose the glass composition in this case such that the theoretically attainable transmission is as high as possible. Accordingly, it is one aspect of the object to minimize the absorption coefficient of the light guide plate through choice of the glass composition.

Another aspect of the object is, through choice of the glass composition, to make the absorption spectrum of the light guide plate more uniform, in particular for long light paths, in the visible wavelength region.

To this end, in accordance with the invention, a light guide plate for guiding visible light is provided with two parallel lateral faces and at least one edge face, which serves preferably as a light input face, wherein the light guide plate is fabricated from a glass that contains $B_2O_3$ and $SiO_2$ as components, wherein the total content of $B_2O_3$ and $SiO_2$ is at least 70 weight percent, preferably at least 80 weight percent, especially preferred at least 90 weight percent, and wherein the total content of metal oxides of divalent metals, in particular of divalent alkaline-earth metals, in the composition of the glass is less than 3 weight percent, and wherein the content of $Al_2O_3$ in the composition is between 1 weight percent and 5 weight percent.

The glass from which the light guide plate is produced is a borosilicate glass according to its composition that comprises $B_2O_3$ and $SiO_2$. The requisite raw materials for the production of borosilicate glass are available in adequately high purity, in particular with very low content of undesired, coloring 3d metal oxides, without a use being prohibited in any case for reasons of cost. Especially preferred, these raw materials are accordingly employed in high purity. Furthermore, it is preferably provided that a mixture of carbonates and nitrates is used as melt raw materials. However, nitrates are employed in a proportion of greater than 2 percent in order to influence advantageously the redox conditions of the melt.

On account of their structural properties, borosilicate glasses approach most closely the transmission behavior of quartz glass. In the wavelength range from 170 to 2000 nanometers, they exhibit no intrinsic absorption, that is, absorption due to the glass composition thereof. The charge-transfer absorption bands (charge transfer bands) of the 3d impurity elements situated in the ultraviolet region do not extend into the visible region, even when the glass is thick, owing to the low intrinsic absorption of the glass matrix components (UV edge is located at approximately 170 nm). Furthermore, the Fresnel losses for borosilicate glasses are less than those for other glasses and also less than that for PMMA owing to the low refractive index.

The glass composition that was surprisingly found within the glass family of borosilicate glasses reduces negative influence factors on the transmission in the wavelength range from 400 nm to 800 nm. The invention provides a highly light-transparent borosilicate glass in the visible spectral region even for long light paths.

The glass composition found further has a compensatory effect, that is, a smoothing effect on the spectral curve of the transmission, in particular in the visible wavelength region. The transmission curve thus typically remains constant in the visible region and, in particular, it is free of undesired selective light absorption due to color-shifting absorption bands.

It is fundamentally the case that minima or maxima in the transmission are enhanced after longer optical paths in the glass because of the exponential relation in the absorption law and thus lead to very strong irregularities in the transmission curve, which then also influence markedly the color reproduction. The glass composition found counteracts such minima and maxima, however. Accordingly, the invention provides a borosilicate glass that is color-neutral (that is, practically colorless) in the visible spectral region, even for long light paths. A uniform curve of the transmission over the visible wavelength region is of special interest so as not to alter the spectral distribution of the light in-coupled into the light guide plate during its passage through the light guide plate. In this way, it is ensured that, for each point on the lateral face of the light guide plate at which light is then out-coupled, the out-coupled light exhibits a spectrum that is as unaltered as possible in comparison to the in-coupled light.

Furthermore, in order to smooth the spectral transmission curve, it can be provided that cerium (Ce) is dispensed with as additive. Accordingly, preferably no cerium oxide is contained in the glass composition.

It is further advantageous to choose the glass composition such that the linear thermal expansion coefficient of the glass is optimally adapted to the typical display glass, that is, to the other typically employed glass panels of a liquid crystal display. Glass of the composition provided in accordance with the invention exhibits in general also a specifically low thermal expansion coefficient. Thus, the linear thermal expansion coefficient at room temperature is, in accordance with a preferred embodiment, in the range from $2.5 \cdot 10^{-6}$ $K^{-1}$ to $4.5 \cdot 10^{-6}$ $K^{-1}$.

The thermal expansion behavior of the light guide plate made of borosilicate glass in accordance with the invention can thus be matched particularly optimally to glasses used in standard practice in TFT/LCD display units. This affords the advantage that the nowadays conventional spacer gaps between display components of different thermal expansion coefficient (e.g., between PMMA and glass panels) can be dispensed with, without the occurrence of mechanical stresses resulting from the different thermal expansions of the display components used. Accordingly, it is possible to reduce markedly the nowadays conventional additional space needed for compensation of the volume and length expansion of the light guide plate. The invention thus makes it possible to design very slim TV sets of only a few millimeters thickness in large format.

In an advantageous manner, the light guide plate made of borosilicate glass in accordance with the invention is also insensitive to moisture. By contrast, conventional PMMA light guides exhibit moisture uptake over the course of time, as a result of which not only is the transmission influenced, but also there results an undesired volume expansion of the PMMA plate. The invention thus makes it possible to match the expansion of the light guide plate, regardless of the ambient humidity, to the expansion of the other glass plates in displays.

As a result of the fine-tuned thermal expansion coefficients as well as the negligible low expansion due to humidity of the light guide plate in accordance with the invention, it is thus possible to reduce or even avoid altogether the spacer gaps between the transparent, flat display components. The flat stacking of the components results, moreover, in an increase in stability. It is also possible to join adhesively to one another flat components that have thermal expansion coefficients fine-tuned to one another, so as to increase the stability still further. Thus, the advantage is afforded that displays can be built to be thinner and, at the same time, more stable. In particular, the invention thereby makes it possible to produce LCD TV sets whose thickness is markedly less than the present minimum thickness of about 30 millimeters. The invention also makes it possible to reduce the weight of the sets. Accordingly, the depth (thickness) of LCD TV sets, in particular those with LED edgelit backlight units, can be brought in the direction of more modern and slimmer OLED TV sets. Because a slim design (and also a low weight) of television displays represents an important characteristic for the differentiation of UHD TV sets on the market, it is thus possible to produce LCD TV sets that are attractive in many respects. On the one hand, the LCD TV sets can be built very thin (and, if appropriate, light); on the other hand, they can have very large diagonals in comparison to OLED TVs at reasonable prices and also score high true-color quality.

Another advantage lies in the fact that, owing to the lower thermal expansion of the light guide plate, the frame of the display can be built more narrow. By contrast, when PMMA light guide plates are employed, wider frames are required in order that compensatory space for expansion is present around the plate. Narrower frames contribute to a preferred esthetic appearance, for example to a more elegant impression of the device.

The light guide plate in accordance with the invention is accordingly suitable for use, in particular, within an optical illumination system for large-format liquid crystal displays or video walls, in particular those based on LED illumination technology with intensive direct or indirect light irradiation.

Included besides these examples are also other fields of application that profit from the high transmission (clearness) and the low chromatic aberration for long light paths, that is, an esthetic appearance. Also included are those applications that profit from a low thermal expansion coefficient of the glass in addition to these advantageous properties.

Besides $B_2O_3$ and $SiO_2$, the glass composition mentioned comprises, as further cross-linking agents, a proportion of $Al_2O_3$, which, in particular, lowers the brittleness of the material. However, conventional raw material carriers for aluminum oxide as a glass component are often contaminated by coloring impurities, which influence negatively the transmission of the glass. The proportion of $Al_2O_3$ in this case is 1 to 5 weight percent. This low content still proves to be adequate for the ability to process the glass and for its strength. On the other hand, however, naturally present but undesired impurities carry only little weight.

According to an embodiment of the invention, it is also possible to employ synthetic aluminum oxide raw material in order to further reduce the absorption of the glass. Although synthetic raw material increases the production costs, production can still be realized in view of the low proportion of 1 to 5 percent in practice. Preferably, the content of $Al_2O_3$ is 1 to 3 percent, especially preferred 1.5 to 2.5 percent.

Besides $Al_2O_3$, the carrier material for MgO also represents a critical raw material, which often introduces, as a natural raw material, undesirable absorbing 3d impurity elements of similar ion size (e.g., Ni, Cu, Mn, etc.). When MgO is optionally used, therefore, it is provided that only small quantities of especially pure material are to be employed.

In the case of glass, solarization can also occur when, through the action of light, in particular energy-rich UV light, the transmission is reduced over the course of time. Owing to its glass composition, the light guide plate in accordance with the invention is characterized in that it is markedly stable to solarization. Herein lies an advantage, in particular in comparison to other types of glass that tend more readily to solarization.

Beyond this, it is possible to provide for a high absorption of the light guide plate in the UV region, which is at least two times, preferably at least five times higher than the highest absorption in the visible region. Such a UV cut-off can be of advantage in order to protect other components, in particular polymers present therein, through which light in-coupled into the light guide plate radiates after it is emitted through the lateral face, from a potential parasitic UV fraction of the in-coupled light.

Another aspect of the invention is to choose the glass composition such that the risk of fracture of panels made from it can be reduced by chemical hardening.

To this end, the glass composition can further comprise also alkali metal oxides, in particular $Na_2O$, $K_2O$, and/or $Li_2O$, so that the light guide plate is fabricated from an alkali borosilicate glass. Through the alkali content, it is possible to adapt the thermal expansion coefficient of the glass. When alkali metals/alkali metal oxides are added, it is additionally possible, in particular, to pre-stress glasses chemically in order to further increase the strength thereof. During chemical hardening (chemical pre-stressing), an ion exchange is brought about, in which, for instance, smaller alkali ions are exchanged for larger homologs, so that, in the exchange zone on the glass surface, a stress profile is introduced into the glass.

However, insofar as a chemical pre-stressing is not desired or not necessary, alkali-free compositions may be preferred.

In general, for example by addition of alkali oxides, it is possible to adapt the light guide plate to the thermal expansion coefficients of other glasses, in particular other glass components in displays, such as substrate glasses situated therein and, if applicable, also the cover glass. Especially preferred, however, is an adaptation of the thermal expansion coefficient of the light guide plate to that of the TFT substrate in an LCD display screen.

Accordingly, depending on the field of application of the light guide plate, its strength can be increased as needed and thus the risk of fracture of the plate can be reduced. This can be of advantage particularly in the case of large display screen diagonals, for instance for TV sets, or for touch screens in, for example, smart phones, tablets, computers, navigation devices, etc.

Further included are, in particular, those applications for which the possibility of a mechanical strengthening of the glass by chemical pre-stressing in combination with the advantage of high transmission (clearness) and/or the advantage of low chromatic aberration of the light guide plate come into consideration.

The required alkali raw materials, in particular $Na_2O$, are available in high purity, without a use thereof being prohibited in any case for reasons of cost. Especially preferred, the alkali raw materials are accordingly employed in high purity.

Provided for, in particular, is a content of 0 to 8 weight percent, preferably of 0 to 4 weight percent of $Na_2O$ in the glass composition. Further provided for is, in particular, a content of 0 to 1 weight percent of $K_2O$. Finally, in particular, a content of 0 to 2 weight percent, preferably of 0 to 1 weight percent of $Li_2O$, is provided for.

In a preferred embodiment of the invention, the light guide plate is characterized in that the $SiO_2$ content is in the range from 65 to 85 weight percent and/or in that the $B_2O_3$ content is in the range from 10 to 20 weight percent. In this case, a high silicon oxide content is especially favorable for achieving a high light transmission.

Further preferred is an embodiment of the invention in which the content of iron in oxidic form in the glass of the light guide plate is less than 60 ppm and/or in which the ratio of the quantity of $Fe^{2+}$ iron ions to $Fe^{3+}$ iron ions is less than 0.05.

A certain proportion of iron cannot be avoided owing to impurities of glass raw materials in general. Whereas, for display glasses, a transmission comparable to PMMA is expected, in particular also for long light paths, starting from a content of iron in oxidic form of less than 10 ppm, it is possible in an advantageous way for borosilicate glass employed in accordance with the invention to tolerate a higher iron content.

With the preferably provided iron content of less than 60 ppm, especially preferred of less than 50 ppm, it is possible to achieve a transmission that approaches or equals that of PMMA.

In order to achieve the intended content of iron in oxidic form or the intended ratio of the quantity of $Fe^{2+}$ ions to $Fe^{3+}$ ions, it is provided, in particular, that a suitable refining of the glass is performed. Through the addition of refining agents, bubbles are eliminated from the completely molten glass in that, for instance, the refining agent releases gases owing to its decomposition.

Preferred is a neutral refinement with sodium chloride (NaCl refinement), which keeps low the content of $Fe^{2+}$ ions. Accordingly, in contrast to other refining agents, the $Fe^{2+}/Fe^{3+}$ ratio, in particular, is minimized.

In an enhancement of the invention, the glass of the light guide plate therefore has halide ions, in particular chloride ions in a proportion of 0.05 weight percent to 0.2 weight percent.

Preferably, redox-active refining agents with direct oxygen delivery, such as $As_2O_5$, $Sb_2O_5$, and, in particular, $SnO_2$ are dispensed with. Such refining agents, in particular conventional tin oxide refining agents, are dispensed with, because the content of $Fe^{3+}$ in comparison to $Fe^{2+}$ would be reduced thereby. The other mentioned refining agents are, moreover, environmentally harmful or unsuitable for the float process. A refinement with tin oxide is accordingly a disadvantage in conjunction with traces of iron in order to achieve an especially high transmission. The same also holds true for a refinement with tin oxide ($SnO_2$) and addition of cerium oxide ($CeO_2$). Cerium compounds are preferably dispensed with in order to smooth out the spectral transmission curve, because cerium oxide in conjunction with low $Fe_2O_3$ impurities itself acts to strongly absorb in the visible spectral region.

Further preferred is an oxidizing melt process, in particular by means of an oxy-fuel combustion unit in order to bring about a transformation of $Fe^{2+}$ to $Fe^{3+}$. In this case, it is possible to select, in particular, a combustion setting with an overstoichiometric proportion of oxygen in the flame. Furthermore, oxygen can be blown into the glass melt during the melting process (so-called $O_2$ bubbling). When oxygen gas is bubbled into the melt, a quantity of greater than 1 L/min, preferably greater than 2.5 L/min, of oxygen per blowing nozzle is preferred. The number of blowing nozzles is determined by the tub size.

Fundamentally, borosilicate glasses exhibit a low basicity, which also has a positive influence on the redox relationships in the glass.

According to an embodiment of the invention, it is further possible to provide a Cr content of 0.05 to 0.7 ppm, especially preferred, less than 0.5 ppm.

Preferably, the total content of the impurity substances Fe, Cu, Cr, Ni, Mn, Ce, Co is less than 0.005 weight percent.

A preferred feature of the borosilicate glass of the invention is that the transmission is at least 93 percent for white light for irradiation through a thickness of 2 millimeters.

Preferably, such a transmission is achieved for white light of conventional white LEDs, which are used for edgelit backlight units. Furthermore, such a transmission is achieved preferably for white light with a continuous spectrum, in particular the terrestrial solar spectrum or the spectrum of a black body radiator, in particular at a temperature of 5800 Kelvin. The visible wavelength region (spectral region) extends, according to a conventional definition, from 400 nm (violet) to 750 nm (red) and sometimes even to 780 nm.

In another preferred embodiment of the invention, the refractive index $n_d$ of the glass of the light guide plate is less than as 1.52, preferably greater than 1.45, especially preferred less than 1.48. Borosilicate glasses according to the invention typically have low refractive indices. With the preferred refractive index in the range from 1.45 to 1.52, it is thus possible to prevent transmission losses due to reflection. This offers an advantage over other commercial flat glasses, which have higher refractive indices. Low refractive indices, such as those preferably provided, are also favorable in order to reduce coupling losses during in-coupling into the glass of liquid crystal displays, in particular for a TFT substrate glass. These glasses often also have relatively low refractive indices, so that the jump in refractive index between the glass panels is only small.

Beyond this, a low refractive index makes possible more flexibility for the in-coupling of light. The light source can thus be positioned more flexibly, without the occurrence of undesired reflection losses. This is especially of advantage when the light guide plate is employed in flat display screens, in which design requirements in regard to the positioning of the light sources are regularly in conflict with a design that is as thin and compact as possible.

It is provided, in particular, that the internal transmittance over the wavelength range from 400 nm to 780 nm is greater than 90 percent, preferably greater than 91 percent, and especially preferred greater than 92 percent for a light path length of 100 millimeters.

The light guide plate preferably has a thickness in the range from 0.5 millimeter to 3 millimeters, especially preferred in the range from 1 millimeter to 2 millimeters. These thicknesses are suitable to be able, even for large backlit display screens, to in-couple an adequate amount of light and, at the same time, to still attain a small total thickness of the display furnished with the light guide plate in accordance with the invention.

The light guide plate preferably has a rectangular shape, corresponding to the conventional shapes of display screens that are to be illuminated. According to one embodiment, the diagonal of the light guide plate has a length of at least 250 millimeters, preferably of at least 500 millimeters.

In order to ensure the stability of the light guide plate, the thickness of the plate can depend on the diagonal. The smaller the diagonal of the plate is, the thinner the plate can be fabricated. It is especially advantageous when the ratio of the thickness to the diagonal is between 0.001 and 0.012, preferably between 0.001 and 0.008, especially preferred between 0.001 and 0.006.

It is typically provided that the light guide plate has a planar rectangular shape. However, it can also be provided that the shape is rectangular, but the light guide plate is curved. A curved light guide plate can be used for so-called curved TV sets.

In a further development of the invention, it is provided that the light guide plate is composed of a float glass panel. In the production of float glass, the refined glass melt is fed onto a tin bath. This results in an especially high surface quality. The surface roughness is accordingly especially low.

This makes possible, on the one hand, a high light guiding and, on the other hand, a very targeted, precise out-coupling of the light from the light guide. This ensures a homogeneous light emission, that is, the prevention of so-called hot spots. Float glass typically also has traces of tin oxide on one of the surfaces, namely, the surface that floats on the tin bath during floating.

In the case of a light guide plate produced in the float process, in particular in the case of large panel, a precise specification of a possible arching results on account of the very smooth surface in an advantageous manner. Such an arching can result, for instance, as a result of pre-stressing.

In accordance with the invention, furthermore, an illumination device for an optical display, in particular a liquid crystal display, is provided. The illumination device comprises a light guide plate in accordance with the invention and, furthermore, at least one light source for in-coupling of light that is guided between the lateral faces of the light guide plate due to total reflection. Moreover, light-scattering structures are included on at least one of the lateral faces of the light guide plate in order to scatter the light fed into the light guide plate, so that the light is emitted from the light guide plate.

In a preferred embodiment, the emission spectrum of the illumination device is fine-tuned to the transmission spectrum of the light guide plate such that the shift in color locus of the light in-coupled from the light source and light emitted again from the light guide plate in the direction of the display unit along the plate has a value $\Delta W_y$ of less than 0.04 (basis CIE standard color table).

Especially preferred, the spectrum of the illumination device is created in such a way and fine-tuned to the transmission spectrum of the glass in such a way that the color locus shift of the light in-coupled from the light source and reemitted from the light guide plate has a component in the direction of the achromatic point. In order that such a component can be present, the color value of the light of the illumination device lies next to the achromatic point. This apparent drawback of an illumination with any remaining coloration leads nonetheless, in conjunction with a spectrally varying transmission of the glass, to an illumination that is as color-neutral as possible.

Finally, in accordance with the invention, a display screen, in particular a liquid crystal display, is provided. The display screen comprises an illumination device in accordance with the invention as well as an actuatable flat-shaped display device positioned opposite to the light guide plate of the illumination device, so that light in-coupled from the light source into the light guide plate and re-irradiated from the light guide plate laterally (from a lateral face) can impinge on the display device and cross through it.

BRIEF DESCRIPTION OF THE DRAWINGS

The invention will be described below in detail on the basis of the appended figures. In the figures, identical reference symbols refer to identical or corresponding elements.

DETAILED DESCRIPTION

Figure 1:
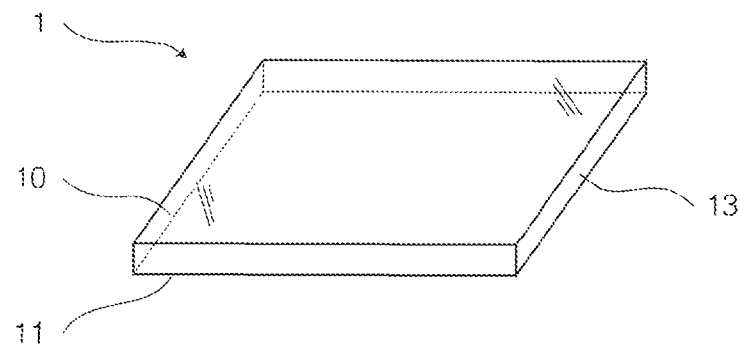
FIG. 1 schematically illustrates, in perspective view, a light guide plate.

FIG. 1 shows schematically a light guide plate 1. The light guide plate 1 comprises two plane-parallel lateral faces 10, 11. The light guide plate has the form of a rectangular glass panel and comprises four edge faces, of which one edge face 13 is provided as a light-input face. Light in-coupled into the edge face 13 is guided, though total reflection at the lateral faces 10, 11, along the lateral faces through them. The path traversed by the light in the light guide plate 1 is very long in comparison with the thickness of the plate. The thickness of the light guide plate 1 is in the range from 0.5 millimeter to 3 millimeters, preferably in the range from 1 millimeter to 2 millimeters.

Although glass is itself a very transparent material, even small absorption coefficients lead here, on account of the long optical path, to a notable absorption. The glass in accordance with the invention is then, on the one hand, suitable for large-scale industrial production by means of a float process, but, on the other hand, nonetheless has such a high transmission that the glass is suitable as a light guide plate with diagonal dimensions of at least 250 millimeters, preferably of at least 500 millimeters, without any resulting serious color locus shifts and drops in intensity. This is achieved by a high total content of $SiO_2$ and $B_2O_3$ (at least 70 weight percent), as well as a present, but small proportion of 1 to 5 weight percent $Al_2O_3$. Owing to the low $Al_2O_3$ content, the content of iron in oxidic form, which is present as an impurity in $Al_2O_3$, can also be reduced easily to less than 60 ppm. The composition with a $SiO_2$ content in the range from 65 to 85 weight percent and a $B_2O_3$ content in the range from 10 to 20 weight percent also supports an extensive oxidation of the iron, so that the ratio of the quantity of iron ions $Fe^{2+}/Fe^{3+}$ is less than 0.05.

Figure 2:
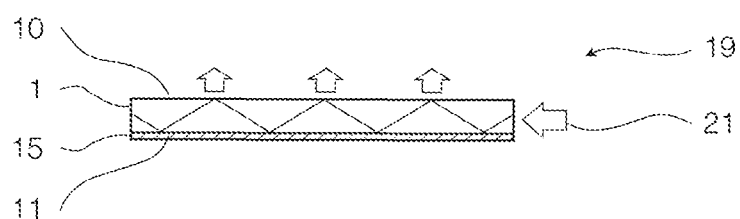
FIG. 2 schematically illustrates, in side view, an illumination device.

FIG. 2 shows schematically an illumination device 19 using a light guide plate made of borosilicate glass in accordance with the invention. The illumination device 19 comprises a light guide plate 1, which has two plane-parallel lateral faces 10, 11. A light source 21, for example, an LED, or a row of LEDs, is situated on the right edge face. The light of the light source 21 is in-coupled through the right edge face into the light guide plate 1 and then guided between the lateral faces 10, 11 of the light guide plate 1 by total reflection. In general, without limitation to the exemplary embodiments, an arrangement of white light-emitting diodes as well as different colored light-emitting diodes can be used as the light source 21 in this case. In the latter case, white light is produced by mixing the colors of different colored light-emitting diodes. For example, white light can be mixed by an arrangement of red, green, and blue light-emitting diodes. It is also possible to combine colored light-emitting diodes with white light-emitting diodes in order to produce light of a desired or adjustable color locus.

Attached to the bottom lateral face 11 of the light guide plate 1 is a reflector layer 15, which scatters the light, so that it is emitted from the light guide plate 1 via the lateral face 10. Other than illustrated, the light can also be in-coupled via a plurality of edges. For example, the in-coupling can occur circumferentially along the circumferential edge face 13. This is especially offered for very large-area illumination devices 20 in order to achieve a homogeneous illumination.

Figure 3:
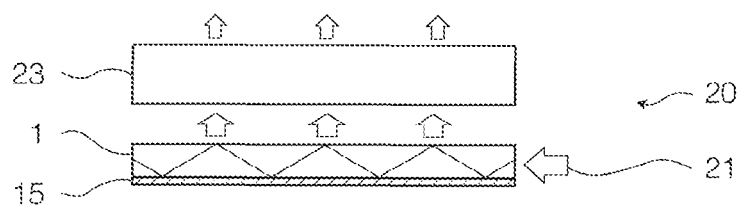
FIG. 3 schematically illustrates, in side view, a display screen.

FIG. 3 shows schematically a display screen 20. The display screen 20 comprises an illumination device composed of the components described in FIG. 2. Moreover, the display screen 20 comprises a display device 23, which is positioned opposite to the light guide plate 1. The light out-coupled from the light guide plate 1 via the top lateral face impinges on the display device 23 and passes through it. As a result, white light that is in-coupled via the light source 21 can be transformed pixel by pixel to colored light.

Figure 4:
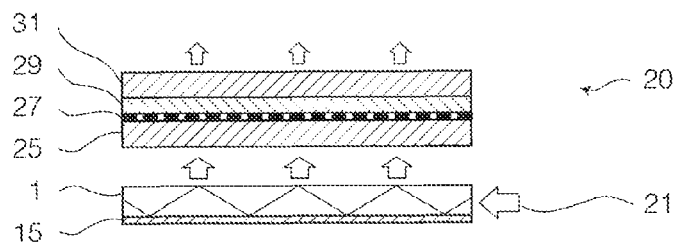
FIG. 4 schematically illustrates in side view, a liquid crystal display screen.

FIG. 4 shows schematically a display screen 20, which is designed as a liquid crystal display screen. The display screen 20 comprises once again an illumination device made from the components described in FIG. 2. The display device of the display screens 20 is a liquid crystal display device, which comprises two substrates 25 and 31, between which a TFT layer 27 as well as an LCD layer 29 (liquid crystal layer) are situated. The substrates 25 and 31 are fabricated from glass.

Figure 5:
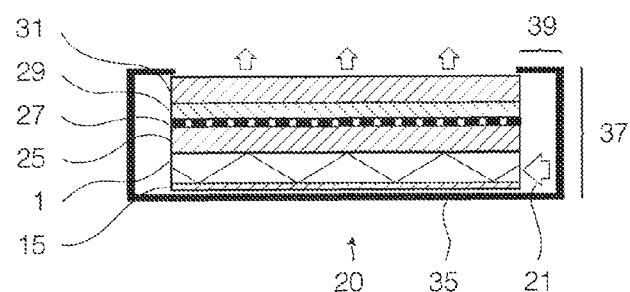
FIG. 5 schematically illustrates, in side view, a liquid crystal display screen with housing.

FIG. 5 shows schematically a display screen 20, designed as a liquid crystal display screen, with a housing 35. Owing to the fact that the light guide plate 1 is comprised of a glass that is adapted to the thermal expansion coefficient of the substrate 25, the light guide plate 1 can rest in a flat manner on the substrate 25, without any spacer gap remaining in between as a compensatory space. In this way, it is possible to achieve a flat design, that is, a small thickness 37 of the housing. Owing to the fact that the light guide plate 1 fabricated of glass has a very small thermal expansion coefficient, furthermore, no notable spacer gaps are required on the edge side of the plate, so that very narrow housing frames 39 can be obtained.

Figure 6:
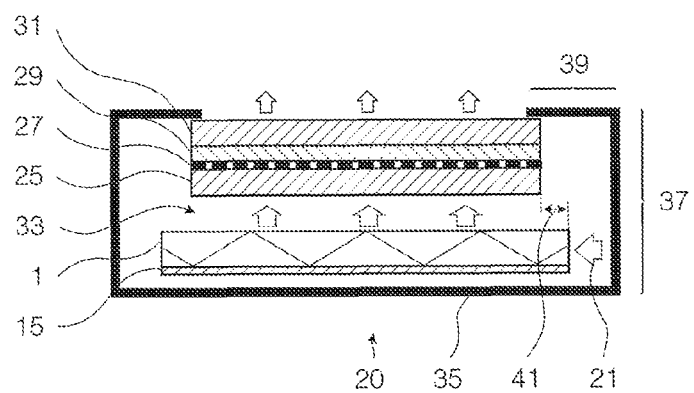
FIG. 6 schematically illustrates, in side view, a liquid crystal display screen with housing from the prior art.

FIG. 6 shows, by contrast, a liquid crystal display screen from the prior art, for which the light guide plate 1 is fabricated from PMMA. As a result of the thermal expansion of the light guide plate 1, a spacing 33 is required between the light guide plate 1 and the substrate 25 of the display device, which results in the thickness 37 of the housing 35 being substantially greater. Furthermore, on the edge side of the light guide plate, that is, around the plate, a spacer gap is provided, in order to make possible the thermal expansion 41 of the plate. As a result, a wider housing frame (housing edge) 39 is required. Overall, the display screen 20 from the prior art thus has larger dimensions for an identical image area.

Figure 7:
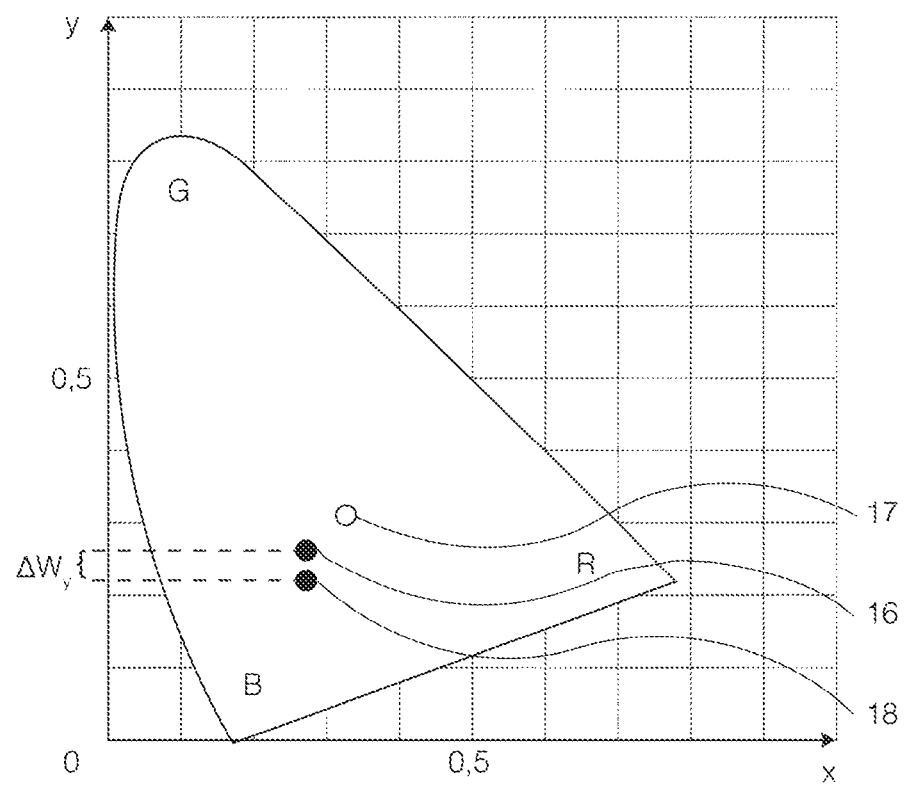
FIG. 7 illustrates a CIE standard color table.

FIG. 7 shows a CIE standard color table. The totality of colors perceptible by humans is illustrated as a white zone. The achromatic point 17, which is also referred to as the white point, is situated at x=y=0.33.

Illustrated are two color points 18 and 16. The color point 18 corresponds to light in-coupled into the light guide plate, while the color point 16 corresponds to light scattered out of the light guide plate. Because the two points do not coincide, a color locus shift takes place. In the example shown, the color locus shifts by $\Delta W_y=0.35$ in the positive direction of the y axis on account of the transmission properties of the glass in accordance with the invention. A color locus shift along the x axis does not take place in the example. Because the achromatic point 17 in the y direction lies closer to the color point 16 than to the color point 18, a color locus shift of the light in-coupled from the light source and then scattered out from the light guide plate occurs in the y direction in the direction to the achromatic point 17. At least one component of the shift is present in the direction to the achromatic point. Such a characteristic shift can be achieved in a simple manner with the glass in accordance with the invention and a white light source.

Figure 8:
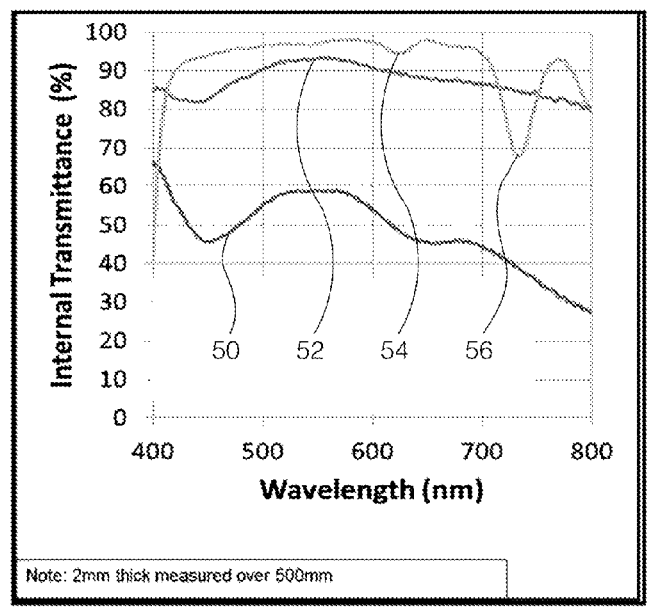
FIG. 8 illustrates spectral internal transmittance of different commercial light guide plates from the prior art.

FIG. 8 shows the pure transmittance 50, 52, 54 measured on different commercially available light guide plates from the prior art. The thickness of the light guide plate is 2 mm in each case and the traversed light path lengths each amount to 500 mm. Pure transmittance is understood to mean the internal transmittance.

It is evident that the internal transmittance 54 of a PMMA light guide is greater than 90 percent, in part greater than 95 percent, in the wavelength range from approximately 420 nm to approximately 780 nm, with, however, a marked drop 56 to less than 70 percent being recorded in the range from approximately 715 nm to approximately 765 nm. This drop 56 in the internal transmittance is due to water molecules taken up in the PMMA light guide. Due to their material, PMMA light guides have the disadvantage that, over the course of time, moisture diffuses into the polymer matrix from the surroundings. By contrast, light guide plates made of glass are advantageously insensitive toward ambient moisture.

A first version of a light guide plate made of an aluminosilicate glass exhibits the internal transmittance 50. Although this curve shows no drop in the transmittance due to water impurity, the internal transmittance 50 is markedly lower above a wavelength of approximately 410 nm than that of the PMMA light guide. It is substantially markedly less than 60 percent. In addition, the internal transmittance 50 is very non-uniform between 420 nm and 780 nm and fluctuates between approximately 30 and 60 percent.

A second version of a light guide plate made of an aluminosilicate glass with reduced iron content exhibits the internal transmittance 52 (corresponds roughly to a Corning Iris™ glass). In contrast to the internal transmittance 50, markedly higher transmittance values are recorded. However, the internal transmittance 52 attains values of greater than 90 percent only in the wavelength range between 500 nm and 600 nm; otherwise, it is less than 90 percent. In the region of blue light of about 440 nm, the transmittance only attains approximately 82 percent. In addition, the internal transmittance drops continuously to approximately 80 percent as it approaches red light.

Figure 9:
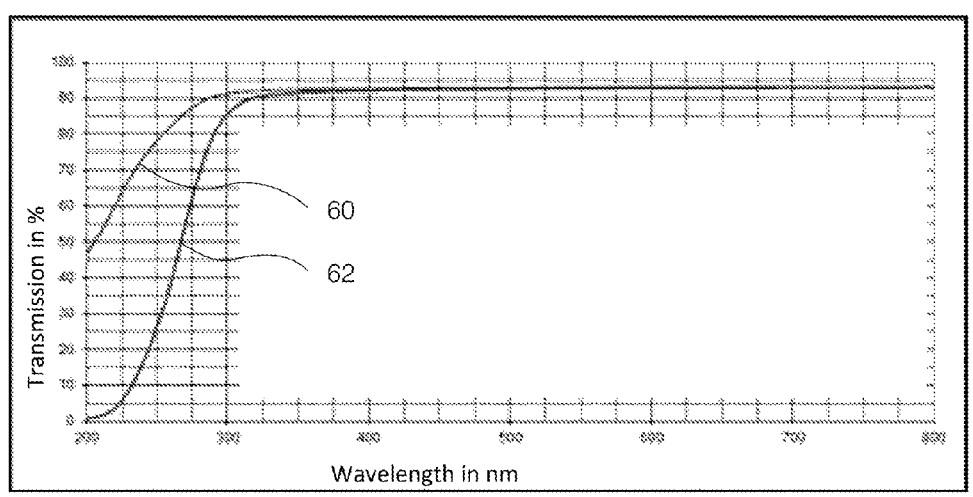
FIG. 9 illustrates spectral transmission of a light guide plate in accordance with the invention for two short light path lengths.

FIG. 9 shows the spectral transmission in the ultraviolet and visible wavelength region of two light guide plates in accordance with the invention for relatively short light path lengths. The transmission 60 was measured for a light path length of 1 mm, the transmission 62 for a light path length of 8 mm.

The two light guide plates were produced with the glass composition 7 corresponding to Table 1 below. The impurity content is 10 ppm $Fe_2O_3$, 9 ppm Ti, 0.4 ppm Mn, 0.3 ppm Cu, 0.2 ppm Cr, less than 0.1 ppm Ni, and less than 0.1 ppm Co. The following raw materials were employed in this case: $SiO_2$ quartz sand A1—JP, Brementhaler Quarzwerk (DE), $B_2O_3$ boric acid, high purity, CHP Chemicals B.V. (NL), $Al_2O_3$ AL(OH)3 ATH BHP, Cell Mark Chemicals (JP), $Na_2O$ Na hydrogen carbonate, BICARTEL, Solvay (B), $K_2O$ K nitrate, Solvadis Chemag Haldor (DK), $Li_2O$ Li carbonate, SQM Europe (NL), and CaO Ca carbonate, Ulmer Weiss, E. Merkle GmbH (DE)

It is evident that the transmissions 60 and 62 are each approximately 92.6 to 93.1 percent over the wavelength region from approximately 380 nm to 800 nm and thus over the entire visible wavelength region, this corresponding to the maximum transmission due to reflection that can be attained. Furthermore, the transmission in the visible wavelength region is markedly uniform in each case. The transmission in the visible wavelength region is thus only relatively weakly dependent on the light path length. In the present example, no difference in the transmission can be found for the two light path lengths of 1 mm and 8 mm (curves 60 and 62) in the visible wavelength region. In the ultraviolet wavelength region, by contrast, the transmission is more strongly dependent on the light path length. It is evident that the transmission drops to 45 percent for light of a wavelength of 200 nm for a light path length of 1 mm (curve 60), whereas it nearly vanishes for a light path length of 8 mm (curve 62).

Figure 10:
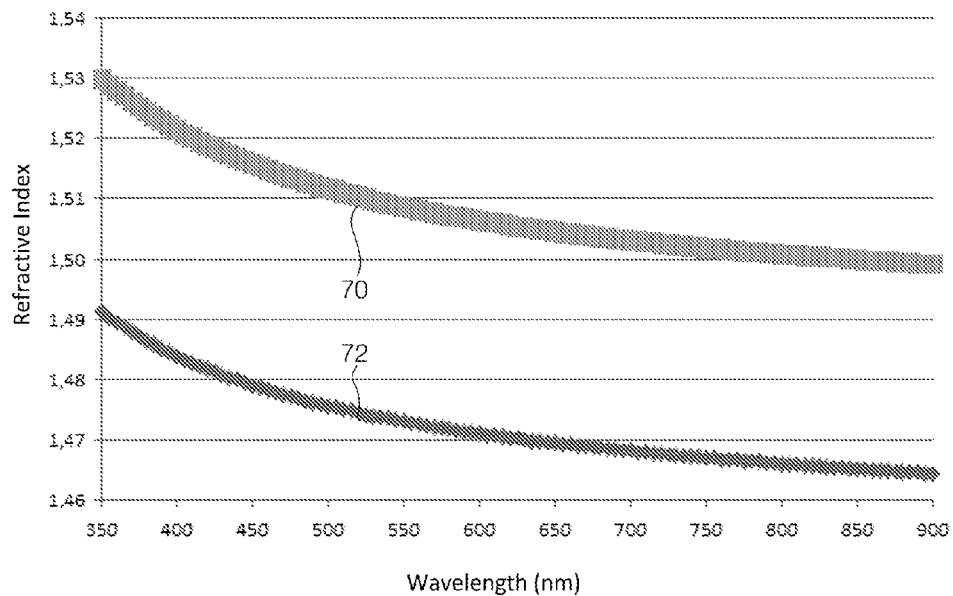
FIG. 10 illustrates dispersion curves of light guide plates made of an alkali aluminosilicate glass and made of a borosilicate glass in accordance with the invention.

FIG. 10 shows dispersion curves, that is, refractive indices as a function of the light wavelength, in each case for a light guide plate made of borosilicate glass in accordance with the invention (refractive index 72) and a light guide plate made of an alkali aluminosilicate glass (refractive index 70).

The alkali aluminosilicate glass has a composition of approximately 60 weight percent $SiO_2$, between 16 and 17 weight percent $Al_2O_3$, and approximately 4 weight percent MgO.

The refractive index 72 of the glass of the light guide plate in accordance with the invention lies between 1.49 and 1.46 in the visible wavelength region. The refractive index thus lies in an especially preferred interval from 1.5 to 1.45. The refractive index 72 decreases with increasing wavelength by less than 0.02 over the visible wavelength region. In particular, the refractive index 72 over the entire visible wavelength region is more than 0.03 less than the refractive index 70 of the alkali aluminosilicate glass.

As is known, it can be derived from Fresnel formulas that, for vertical impingement of light from a medium with a refractive index of 1 onto a medium with a refractive index of n, a fraction $(n-1)^2/(n+1)^2$ is reflected. If, in addition, multiple reflections are taken into account on two planeparallel faces, there results a maximum transmission due to reflections of $2n/(n^2+1)$.

Figure 11:
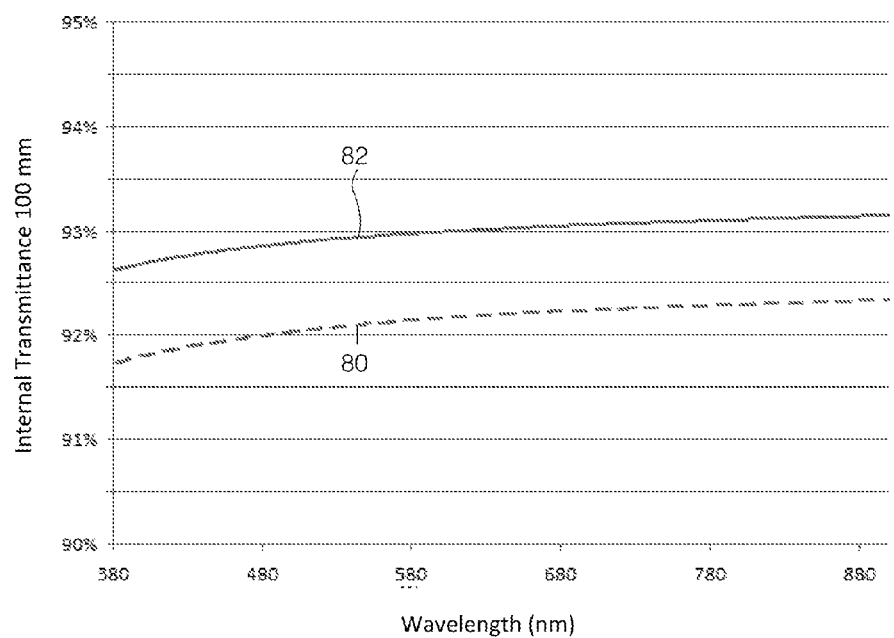
FIG. 11 illustrates spectral maximum transmission of light guide plates made of an alkali aluminosilicate glass and made of a borosilicate glass in accordance with the invention.

FIG. 11 shows the thereby calculated maximum transmission 82 for the light guide plate made of borosilicate glass in accordance with the invention with the refractive index 72 and the maximum transmission 80 for the light guide plate made of alkali aluminosilicate glass with the refractive index 70.

It is evident that the light guide plate made of borosilicate glass in accordance with the invention has a maximum transmission that is approximately 1.5 percentage points higher than the light guide plate made of the alkali aluminosilicate glass. According to the present calculation, the light guide plate made of alkali aluminosilicate glass cannot attain a transmission higher than approximately 92.7 percent in the visible wavelength region. By contrast, the light guide plate made of borosilicate glass in accordance with the invention can attain a transmission of up to 93.1 percent in the visible wavelength region. For light of wavelength 380 nm, the maximum transmission is 92.6 percent; it is 93 percent for light of wavelength 600 nm, and 93.1 percent for light of wavelength 780 nm. Between these values, the maximum transmission increases strictly monotonically in each case for increasing wavelength. A light guide plate made of borosilicate glass is accordingly to be preferred from the aspect of maximally attainable transmission when compared to a light guide plate made of alkali aluminosilicate glass.

Figure 12:
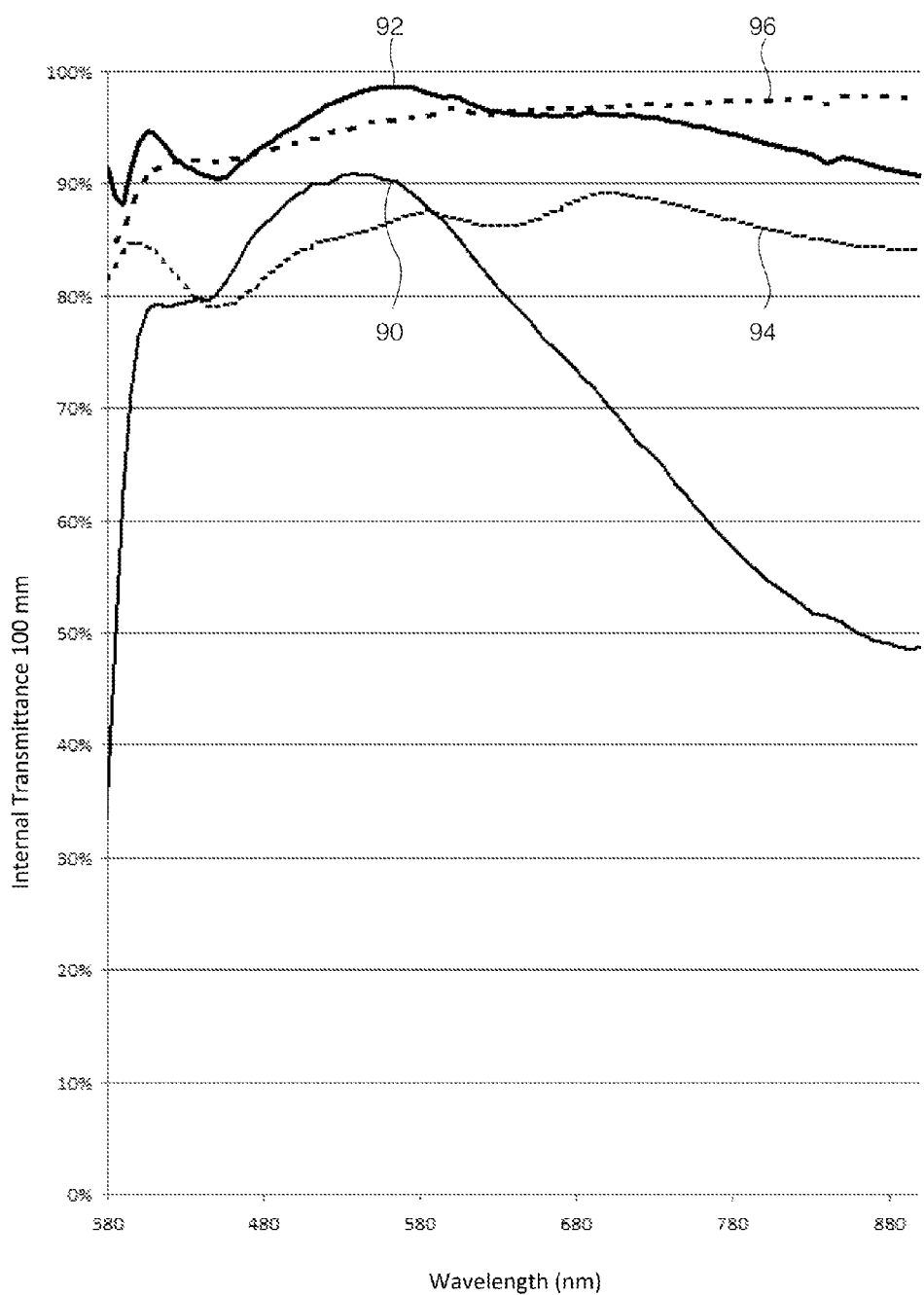
FIG. 12 illustrates spectral internal transmittance of light guide plates made of alkali aluminosilicate glasses and borosilicate glasses in accordance with the invention, each with different $Fe_2O_3$ content.

FIG. 12 shows the internal transmittances 90 and 94 of light guide plates made of alkali aluminosilicate glasses with $Fe_2O_3$ contents of 120 ppm and 22 ppm, respectively. The composition of the alkali aluminosilicate glasses has approximately 60 weight percent $SiO_2$, between 16 and 17 weight percent $Al_2O_3$, and approximately 4 weight percent MgO. Further shown is the internal transmittance 92 and 96 of light guide plates made of borosilicate glasses in accordance with the invention of the composition according to Example 7 in Table 1 with $Fe_2O_3$ contents of 80 ppm and 12 ppm. The light guide plate with the internal transmittance 96 was fused in a Pt laboratory crucible, so that the transmittance in the short-wavelength region below approximately 600 nm turns out to be somewhat less in comparison to a plate fused on a production scale. All transmission curves shown were determined for light path lengths of 100 mm.

The internal transmittance 94 of the alkali aluminosilicate glass containing 22 ppm iron fluctuates between 79 and 89 percent over the visible wavelength region. By contrast, the internal transmittance 90 of the alkali aluminosilicate glass containing 120 ppm iron has a maximum value of 90.8 percent at 545 nm, dropping off strongly on either side. At 380 nm, the transmission is still only 36.2 percent; at 780 nm it is still only 57.6. It is evident from this that the transmission of alkali aluminosilicate glass depends appreciably on the iron content.

By contrast, the dependence of the transmission on the iron content is appreciably less for a light guide plate made of borosilicate glass in accordance with the invention. The internal transmittance 96 of a borosilicate glass containing 12 ppm iron is consistently markedly greater than 90 percent at 400 nm and above and increases to 97.8 percent at 780 nm. The internal transmittance 92 of a borosilicate glass containing 80 ppm iron is also always greater than 90 percent at approximately 400 nm and above. It attains a maximum value of 98.7 percent at 565 nm and upwards thereof it drops slightly to 94.4 percent at 780 nm. In particular, in the region of red light, accordingly, a slight decrease in the transmission with increasing iron content is to be found, but it is appreciably less than for alkali aluminosilicate glasses. Accordingly, the borosilicate glass of the light guide plate in accordance with the invention has, in particular, a transmission that, for different $Fe_2O_3$ contents, in particular between 12 ppm and 80 ppm, leads only to fluctuations of at most 5, preferably 3.5 percentage points.

In addition, with reference to the curves 92 and 96, the transmission of the light guide plates made of borosilicate glass in accordance with the invention fluctuates in the visible wavelength region above 400 nm by less than 10 percentage points, preferably less than 5 percentage points. The borosilicate glass of light guide plates in accordance with the invention thus acts to make the transmission curve more uniform.

It is further noteworthy that the internal transmittance 92 of the borosilicate glass containing 80 ppm iron is higher over the entire visible wavelength region than the internal transmittance 94 of the alkali aluminosilicate glass containing only 22 ppm iron. The borosilicate glass therefore has an internal transmittance that is on average nearly 10 percentage points greater for nearly four times the iron content. Light guide plates made of borosilicate glass in accordance with the invention are accordingly especially suitable for light guiding.

In the following Table 1, 9 glass compositions of light guide plates in accordance with the invention are given with their associated properties:

TABLE 1

Glass compositions of light guide plates in accordance with the invention

| Glass | | 1 | 2 | 3 | 4 | 5 | 6 | 7 | 8 | 9 |
|---|---|---|---|---|---|---|---|---|---|---|
| $SiO_2$ wt % | | 81.0 | 80.0 | 77.0 | 80.9 | 74.0 | 72.9 | 80.8 | 80.4 | 78.4 |
| $B_2O_3$ wt % | | 16.0 | 17.0 | 20.0 | 15.1 | 23.0 | 20.8 | 12.7 | 12.9 | 11.9 |
| $Al_2O_3$ wt % | | 1.0 | 1.0 | 1.0 | 1.1 | 1.0 | 1.0 | 2.4 | 2.4 | 3.9 |
| $Na_2O$ wt % | | 0.5 | 0.5 | 0.5 | 2.8 | 0.5 | 1.1 | 3.5 | 4.0 | 5.0 |
| $K_2O$ wt % | | 1.0 | 1.0 | 1.0 | — | 1.0 | 0.9 | 0.6 | — | 0.6 |
| $Li_2O$ wt % | | 0.5 | 0.5 | 0.5 | — | 0.5 | 0.5 | — | — | — |
| CaO wt % | | — | — | — | — | — | — | — | — | 0.2 |
| $\rho$ g · cm$^{-3}$ | | 2.1717 | 2.1717 | 2.1583 | 2.18 | 2.1454 | 2.1321 | 2.22 | 2.22 | 2.264 |
| $\alpha$ 10$^{-6}$K$^{-1}$ | | 2.6 | 2.65 | 2.85 | 2.77 | 3.07 | 3.29 | 3.28 | 3.29 | 4.1 |
| Tg ° C. | | 527 | 517 | 500 | 530 | 486 | 467 | 528 | 533 | 560 |
| Temp. lg $\eta$ = | 2 | 1946 | 1962 | 1872 | 1915 | 1841 | 1764 | 1950 | 1890 | 1910 |
| | 3 | 1537 | 1526 | 1471 | 1512 | 1430 | 1377 | 1538 | 1504 | 1520 |
| | 4 | 1283 | 1264 | 1224 | 1260 | 1184 | 1143 | 1280 | 1252 | 1240 |
| | 7.6 | 841 | 823 | 798 | 810 | 770 | 750 | 820 | 812 | 823 |
| | 13 | 595 | 586 | 564 | 560 | 549 | 538 | 560 | 567 | 593 |
| $n_d$ | | 1.469 | 1.467 | 1.466 | 1.470 | 1.464 | 1.465 | 1.471 | 1.472 | 1.479 |
| $Fe_2O_3$ ppm | | | | | | | | 10 | | |
| Cr ppm | | | | | | | | 0.2 | | |
| Ni ppm | | | | | | | | <0.1 | | |
| Co ppm | | | | | | | | <0.1 | | |
| Cu ppm | | | | | | | | 0.3 | | |
| Mn ppm | | | | | | | | 0.4 | | |
| Ti ppm | | | | | | | | 9.0 | | |

For the glass composition 7, the impurity concentrations given in the foot of the table were determined. The impurity contents of the other glass compositions differ from one another only in terms of the altered quantities of the raw materials used and the purity grade of these raw materials used in each case.

For the production of glasses and light guide plates fabricated from them, it is possible to employ, in particular, the especially clean raw materials listed in the description of FIG. 9. In this way, it is possible to attain a purity of the respective glass that is as high as possible. Either all of the high-purity raw materials listed in the description of FIG. 9 can be used at the same time or else only individual high-purity raw materials can be employed. The use of only individual clean raw materials is possible in particular, because the light guide plates made of borosilicate glass in accordance with the invention are especially tolerant toward critical impurities, as has been described above.

In the following Table 2, glass compositions of commercial flat glasses are given, which are, in particular, not suited for production of light guide plates in accordance with the invention

TABLE 2

Glass compositions of commercial flat glasses

| Glass application | Standard float glass | TFT glass | PDP glass | Glass ceramic | Aluminosilicate glass 1 | Aluminosilicate glass 2 | Aluminosilicate glass 3 |
|---|---|---|---|---|---|---|---|
| $SiO_2$ wt % | 72.5 | 58.5 | 57.5 | 65.5 | 61.5 | 62.0 | 61.5 |
| $B_2O_3$ wt % | — | 7.5 | — | — | — | — | 4.0 |
| $Al_2O_3$ wt % | 1.1 | 16.5 | 7.0 | 21.5 | 13.5 | 16.5 | 19.5 |
| $Na_2O$ wt % | 13.0 | — | 4.5 | 0.5 | 11.5 | 12.5 | 13.0 |
| $K_2O$ wt % | 0.3 | — | 6.5 | 0.5 | 6.0 | 4.0 | — |
| $Li_2O$ wt % | — | — | — | 4.0 | — | — | — |
| MgO wt % | 4.0 | 5.0 | 2.0 | 1.0 | 5.5 | 4.0 | 1.5 |
| CaO wt % | 8.8 | 5.0 | 4.5 | — | 0.5 | — | — |
| ZnO wt % | — | — | — | — | — | — | — |
| SrO wt % | — | 6.0 | 7.0 | — | — | — | — |
| BaO wt % | — | — | 8.0 | 1.5 | — | — | — |
| $ZrO_2$ wt % | — | 1.0 | 3.0 | 2.0 | 1.0 | — | — |
| $TiO_2$ wt % | — | — | — | 2.0 | — | 1.0 | — |
| Other wt % | 0.3 | 0.5 | — | 1.5 | 0.5 | 0.5 | 0.5 |
| $Fe_2O_3$ wt % | 0.11 | 0.015 | 0.015 | 0.020 | 0.020 | 0.010 | 0.0025 |
| $n_d$ | 1.517 | 1.524 | 1.541 | 1.521 | 1.512 | 1.508 | 1.491 |

Regardless of the glass composition, a light guide plate with two parallel lateral faces and at least one edge face serving preferably as a light-input face is provided in the scope of the invention, wherein the internal transmittance of the light guide plate is at least 90 percent, preferably at least 91 percent, especially preferred at least 92 percent for white light for a light path length of 100 millimeters. This light guide plate, characterized by its internal transmittance for white light, can have, in particular, additional features already described above and can be used as part of an illumination device and/or a display screen.

What is claimed is:

1. A light guide plate for guiding visible light, comprising a glass having two parallel lateral faces and at least one edge face that serves as a light-input face, the glass comprising a composition that includes $B_2O_3$ and $SiO_2$, wherein the composition has a total content of $B_2O_3$ and $SiO_2$ that is at least 70 weight percent, a total content of metal oxides of divalent metals that is less than 3 weight percent, a ratio of iron ions $Fe^{2+}/Fe^{3+}$ that is less than 0.05, and a content of $Al_2O_3$ that is between 1 weight percent and 5 weight percent, and wherein the glass has an internal transmittance that is at least 90 percent for white light for a light path length of 100 millimeters.

2. The light guide plate according to claim 1, wherein the total content of $B_2O_3$ and $SiO_2$ is at least 80 weight percent.

3. The light guide plate according to claim 1, wherein the total content of $B_2O_3$ and $SiO_2$ is at least 90 weight percent.

4. The light guide plate according to claim 1, wherein the composition has a content of $SiO_2$ that is between 65 to 85 weight percent and/or a content of $B_2O_3$ that is between 10 to 20 weight percent.

5. The light guide plate according to claim 1, wherein the composition has a content of iron in oxidic form that is less than 60 ppm.

6. The light guide plate according to claim 5, wherein the glass has a refractive index that is less than 1.52.

7. The light guide plate according to claim 6, wherein the refractive index is greater than 1.45.

8. The light guide plate according to claim 5, wherein the glass has a linear thermal expansion coefficient at room temperature that is in the range from $2.5 \cdot 10^{-6} K^{-1}$ to $4.5 \cdot 10^{-6} K^{-1}$.

9. The light guide plate according to claim 5, wherein the glass has a transmission that is at least 93 percent for white light for an irradiated thickness of 2 millimeters.

10. The light guide plate according to claim 1, wherein the composition comprises halide ions.

11. The light guide plate according to claim 10, wherein the halide ions comprise chloride ions with a proportion of 0.05 weight percent to 0.2 weight percent.

12. The light guide plate according to claim 1, wherein the glass has a thickness between the two parallel lateral faces that is from 0.5 millimeter to 3 millimeters.

13. The light guide plate according to claim 1, wherein the light guide plate has a rectangular shape and diagonals thereof have a length of at least 250 millimeters.

14. The light guide plate according to claim 1, wherein the glass is a float glass panel.

15. The light guide plate according to claim 1, wherein the internal transmittance is at least 92 percent.

16. An illumination device for a liquid crystal display, comprising:
a light guide plate including a glass having two parallel lateral faces and at least one edge face that serves as a light-input face, the glass comprising a composition that includes $B_2O_3$ and $SiO_2$, wherein the composition has a total content of $B_2O_3$ and $SiO_2$ that is at least 70 weight percent, a total content of metal oxides of divalent metals that is less than 3 weight percent, a ratio of iron ions $Fe^{2+}/Fe^{3+}$ that is less than 0.05, and a content of $Al_2O_3$ that is between 1 weight percent and 5 weight percent, and wherein the glass has an internal transmittance that is at least 90 percent for white light for a light path length of 100 millimeters;
at least one light source for in-coupling of light to the at least one edge face, the light being guided between the lateral faces of the light guide plate by total reflection; and
light-scattering structures on at least one of the lateral faces, the light-scattering structures being sufficient to scatter the light guided in the light guide plate so that the light is emitted from the light guide plate.

17. The illumination device according to claim 16, wherein the light in-coupled from the at least one light source and the light scattered out from the light guide plate along the plate has a color locus shift with a value $\Delta W_y$ of less than 0.04.

18. The illumination device according to claim 16, wherein the light in-coupled from the least one light source and the light scattered out from the light guide plate has a color locus shift with a component in the direction to an achromatic point.

19. A liquid crystal display comprising:
an illumination device having a light guide plate, the light guiding plate including a glass having two parallel lateral faces and at least one edge face that serves as a light-input face, the glass comprising a composition that includes $B_2O_3$ and $SiO_2$, wherein the composition has a total content of $B_2O_3$ and $SiO_2$ that is at least 70 weight percent, a total content of metal oxides of divalent metals that is less than 3 weight percent, a ratio of iron ions $Fe^{2+}/Fe^{3+}$ that is less than 0.05, and a content of $Al_2O_3$ that is between 1 weight percent and 5 weight percent, and wherein the glass has an internal transmittance that is at least 90 percent for white light for a light path length of 100 millimeters;
at least one light source for in-coupling of light to the at least one edge face, the light being guided between the lateral faces of the light guide plate by total reflection;
light-scattering structures on at least one of the lateral faces, the light-scattering structures being sufficient to scatter the light guided in the light guide plate so that the light is emitted from the light guide plate; and
an actuatable flat-shaped display device positioned opposite to the light guide plate so that the light in-coupled from the at least one light source and emitted from the light guide plate laterally impinges on and passes through the display device.

* * * * *